United States Patent
Aoyama

(10) Patent No.: US 7,292,007 B2
(45) Date of Patent: Nov. 6, 2007

(54) VEHICULAR ELECTRIC GENERATION CONTROL APPARATUS AND RELATED METHOD OF DETECTING ELECTRIC GENERATION STATUS

(75) Inventor: Toru Aoyama, Okazaki (JP)

(73) Assignee: Denso Corporation, Kariya (JP)

( * ) Notice: Subject to any disclaimer, the term of this patent is extended or adjusted under 35 U.S.C. 154(b) by 86 days.

(21) Appl. No.: 11/354,176

(22) Filed: Feb. 15, 2006

(65) Prior Publication Data

US 2006/0181248 A1    Aug. 17, 2006

(30) Foreign Application Priority Data

Feb. 15, 2005    (JP) .............................. 2005-037429

(51) Int. Cl.
H02P 9/00    (2006.01)
H02H 7/06    (2006.01)

(52) U.S. Cl. .............................. 322/24; 322/25; 322/27; 322/28

(58) Field of Classification Search .................. 322/22, 322/23, 24, 25, 27, 28, 37
See application file for complete search history.

(56) References Cited

U.S. PATENT DOCUMENTS

| | | | |
|---|---|---|---|
| 4,672,297 A | 6/1987 | Gotoh et al. | |
| 5,629,606 A * | 5/1997 | Asada | .......................... 322/28 |
| 6,014,016 A | 1/2000 | Maruyama et al. | |
| 6,756,761 B2 * | 6/2004 | Takahashi et al. | .......... 318/599 |
| 6,812,675 B2 | 11/2004 | Okamoto et al. | |
| 6,850,042 B2 * | 2/2005 | Kouwa | .......................... 322/24 |
| 7,098,628 B2 * | 8/2006 | Maehara et al. | .............. 322/24 |
| 7,106,029 B2 * | 9/2006 | Inokuchi et al. | .............. 322/28 |
| 7,183,749 B2 * | 2/2007 | Maehara | ....................... 322/22 |
| 7,199,559 B2 * | 4/2007 | Yanagi | ........................ 322/33 |

FOREIGN PATENT DOCUMENTS

| | | |
|---|---|---|
| JP | U 60-181200 | 12/1985 |
| JP | A 10-51976 | 2/1998 |
| JP | A 2003-79196 | 3/2003 |

* cited by examiner

*Primary Examiner*—Nicholas Ponomarenko
(74) *Attorney, Agent, or Firm*—Oliff & Berridge, PLC

(57) ABSTRACT

A control apparatus controls the generation of a vehicle electric generator having an armature winding, excitation winding and rectifier connected to the armature winding. The apparatus includes a flywheel diode connected to the excitation winding in parallel, a switch element connected to the excitation winding, a control signal setting circuit, and a signal output section. The setting circuit controls a duty ratio of the switch element in correspondence to a first generation status of the generator to control electric current flowing through the excitation winding while varying a switching frequency of the generator depending on a second generation status of the generator. The signal output section is connected to a junction point between the excitation winding and the switch element and outputs a signal, involving a duty ratio associated with the first generation status and a switching frequency associated with the second generation status, to an external device.

16 Claims, 7 Drawing Sheets

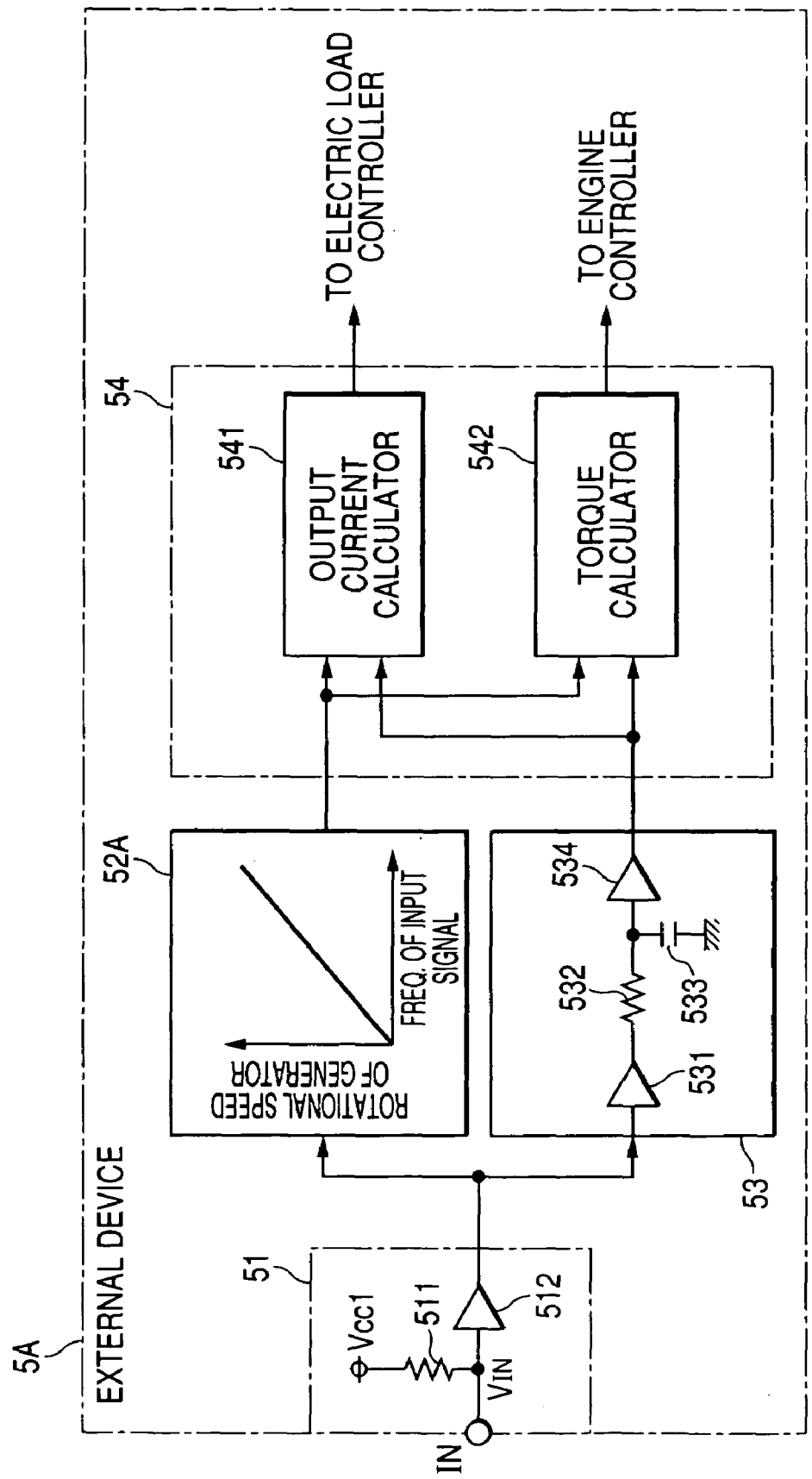

VEHICULAR ELECTRIC GENERATION CONTROL APPARATUS AND RELATED METHOD OF DETECTING ELECTRIC GENERATION STATUS

CROSS-REFERENCE TO RELATED APPLICATION

This application is based on and claims the benefit of priority from earlier Japanese Patent Application No. 2005-037429 filed on Feb. 15, 2005, the description of which is incorporated herein by reference.

BACKGROUND OF THE INVENTION

1. Technical Field of the invention

The present invention relates to a vehicular electric generation control apparatus, which controls an electric generation status of a vehicle electric generator installed on a passenger car or truck, and a related method for detecting an electric generation status.

2. Related Art

Electric generation torque of a vehicle electric generator, driven by an engine, increases with an increase in electric power supplied to a battery and electrical loads installed on a vehicle, resulting in an increase in load of the engine. To address such an issue, an attempt has heretofore been made in the related art to use an AC generator control apparatus operative to control opening and closing states of a throttle valve depending on an electric generation-rate of the vehicle electric generator for thereby stabilizing an idling speed of the engine as disclosed in, for instance, Utility Model Laid-Open Publication No. 60-181200.

With such an AC generator control apparatus, a pulse signal, occurring at a junction point between a field coil of the vehicle electric generator and the electric generation control apparatus (in particular, a switch section for controlling a field current), is outputted from a signal output terminal (terminal F). An external engine controller detects a duty ratio of this pulse signal, enabling the electric generation-rate of the electric generator to be obtained.

Further, with such a control apparatus, a current limiting element is connected between the field coil and the terminal F. This precludes uncontrollable electric current from flowing to the field coil in the occurrence of a short-circuiting failure between a signal line, starting from the terminal F to the external engine controller, and ground to avoid an abnormal increase in an electrical generation voltage. Also, this prevents wasteful electric power consumption caused by current flowing from the battery to the field coil during a halt of the battery, thereby preventing the battery from over-discharging.

Further, a vehicular electric generation control apparatus has heretofore been known including a circuit for controlling a charge alarm lamp and an alarm signal output terminal (terminal L). The vehicular electric generation control apparatus, installed in an engine room, is connected to the charge alarm lamp, mounted on an instrument panel at a position near a driver's seat, using an elongated wiring, directly driving the charge alarm lamp. Since such an elongated wiring is used, consideration should be undertaken for a voltage drop and current capacity of such a wiring in order to ensure a brightness of the charge alarm lamp when turned on. Therefore, the wiring cannot be formed to be thin and light in weight.

To address such an issue, a proposal has been made to provide a vehicular electric generation control apparatus wherein the instrument is formed with a circuit for driving a charge alarm lamp to allow an electric generator side to transmit a signal for controlling the charge alarm lamp for thereby forming the wiring, extending from the electric generator to the instrument panel, in a thin configuration as disclosed in, for instance Japanese Patent Laid-Open Publication No. 10-51976.

Further, carrying out the two related art manufacturing methods intact results in a vehicular electric generation control apparatus arranged to perform separate controls for a field coil and alarm lamp. Therefore, there is a need for driver circuits and signal output terminals in dual systems and signals lines in dual systems. To overcome such an issue, a proposal has been made in the related art to provide a vehicular electric generation control apparatus wherein a plurality of electric generation-status signals are loaded into an external device to incorporate a signal line in a single system as disclosed in, for instance, Japanese Patent Laid-Open Publication No. 2003-79196.

With such a vehicular electric generation control apparatus, information related to an electric generation status (a conducting status of a field winding) and information related to an abnormal status related to an electric generator are transmitted via a signal line. In particular, during normal operation, a duty ratio of an electric generation signal is set to be greater than a value of 10%, providing an external device with notification of the presence of normal operation. Also, during abnormal operation, a signal masking circuit is arranged to set the duty ratio of the electric generation signal to a value less than 10%, providing the external device with notification of the presence of abnormal operation.

However, although the related art disclosed in Japanese Patent Laid-Open Publication No. 2003-79196 can be formed in a simplified signal line, a need arises for additionally providing a signal output driver incorporating a special signal masking circuit. Therefore, the vehicular electric generation control apparatus becomes complicated in structure with the resultant increase in a size of an IC to which circuits are incorporated, causing an issue with an increase in costs.

Further, with such a related art, the signal masking circuit tends to determine a signal for transmission regardless of a turned-off status of a transistor by which electric current flowing through a field winding is controlled. Therefore, although this enables the external device to obtain an abnormal status of the electric generator, causing the occurrence of issues with a loss of information with the resultant lapse in communication.

SUMMARY OF THE INVENTION

The present invention has been completed with the above view in mind and has an object to provide a vehicular electric generation control apparatus that can simplify a signal line with the resultant reduction in costs and prevent a loss and lapse of information in communication.

To solve the above issues, one aspect of the present invention provides a vehicular generation control apparatus, operative to control an electric generation status of a vehicle electric generator having an armature winding, an excitation winding and a rectifier connected to the armature winding, which comprises a flywheel diode connected to the excitation winding in parallel thereto, switch means connected to the excitation winding to be turned on and off in response to a control signal being inputted, control signal setting means operative to control a duty ratio of the switch means depending on a first electric generation status of the vehicle electric generator for controlling an electric current flowing through the excitation winding while setting the control signal, to be applied to the switch element, so as to vary a switching frequency of the switch means depending on a second electric generation status, and signal outputting means connected to a junction point between the excitation winding and the switch means and operative to output a signal, involving a component of the duty ratio associated with the first electric generation status and a component of the switching frequency associated with the second electric generation status, to an external device through a signal line.

With such a configuration, using the duty ratio and switching frequency of the switch means, by which an electric current flowing through the excitation winding is controlled, allows the signal to be generated involving the duty ratio component associated with the first electric generation status and the frequency component associated with the second electric generation status. Therefore, a single output driver can be used to output a plurality of electric generation statuses, causing simplification of a signal line with a reduction in costs while enabling the elimination of a loss and lapse of information in communication.

Further, the control signal setting means may preferably comprise first comparator means for making comparison between an output voltage of the vehicle electric generator and a first predetermined reference voltage, first smoothing means for smoothing an output of the first comparator means with a first time constant, second comparator means for making comparison between a smoothed voltage outputted from the first smoothing means and a ramp-wave voltage, by which the switching frequency is determined and regulated voltage control means for determining the duty ratio depending on a comparison result of the second comparator means. This makes it able for the duty ratio component to be generated in correspondence to the conducting status of the excitation winding depending on the output voltage of the vehicle electric generator, enabling electric generation-rate information to be outputted as the first electric generation status.

Also, the control signal setting means may further preferably comprise modulation means that varies a frequency of the ramp-wave voltage. This makes it able for the modulation means to alter the switching frequency without adversely affecting the duty ratio of the switch means. That is, no adverse affect is caused in electric generation-rate information, outputted from the signal output terminal with no influence on the output of the vehicle electric generator.

Moreover, the modulation means may preferably determine the frequency of the ramp-wave voltage depending on a signal, occurring on the armature winding, which is associated with a rotational speed of the vehicle electric generator. This makes it able for both of electric generation-rate information of the vehicle electric generator and the switching frequency component, associated with the rotational speed of the vehicle electric generator to be generated, enabling rotational speed information of the vehicle electric generator to be outputted as the second electric generation status.

In addition, the modulation means may preferably comprise second smoothing means for smoothing a voltage, generated by the armature winding, with a second time constant, and switchover means operative to switch over the frequency of the ramp-wave voltage when a smoothed voltage, outputted from the second smoothing means, exceeds a given value. This makes it able for the modulation means to concurrently output electric generation-rate information of the vehicle electric generator and, in addition thereto, alarm information accompanied by a start of the vehicle electric generator to generate electric power in the second electric generation status under a condition where the switching frequencies are switched over depending on whether or not electric power generation is normally started.

Moreover, the modulation means may preferably comprise third comparator means operative to make comparison between an output voltage of the vehicle electric generator and a predetermined voltage previously set to be lower than a battery open voltage for altering the frequency of the ramp-wave voltage depending on a comparison result of the third comparator means. This makes it able for the modulation means to concurrently output electric generation-rate information of the vehicle electric generator and, in addition thereto, alarm information accompanied by a start of the vehicle electric generator to generate electric power in the second electric generation status under a condition where the switching frequencies are switched over when a voltage drop occurs in the vehicle electric generator.

Further, the modulation means may preferably comprise overheat protector means operative to set the first reference voltage, to be used in the first comparator means, to a second reference voltage lower than the battery open voltage when a temperature exceeds a given value while altering the frequency of the ramp-wave voltage. This makes it able for the reference voltage to be set to a value less than the battery open voltage when the temperature of the vehicle electric generator exceeds the given value. Thus, the duty ratio of the switch means is minimized to restrict electric generation current to eliminate development of heat, thereby protecting the vehicle electric generator from overheating. Also, electric generation-rate information occurring in this phase can be outputted as the first electric generation status and, additionally, the switching frequency is switched over to simultaneously output alarm information, accompanied by abnormal overheating of the vehicle electric generator, as the second electric generation status, Furthermore, the signal output means may preferably comprise current limiting means that limits an electric current between the junction point and the signal line. This makes it possible to limit electric current flowing from the junction point between the excitation winding and the switch means to the signal line or to limit electric current flowing from the signal line to the relevant junction point. Therefore, when failures take place in short-circuiting to ground of the signal line or erroneous connection is established to the battery potential, it becomes possible to avoid any defect such as abnormal rise in generated voltage during rotation of the engine, overcharging of the battery during a halt of the engine and damages of the switch means and current limiting element (diode) caused by short-circuited current from the battery.

Moreover, another aspect of the present invention provides a method of detecting an electric generation status of an electric generation system which comprises a vehicle electric generator driven by an engine and having an armature winding, an excitation winding and a rectifier connected to the armature winding, a vehicular electric generation control apparatus including a flywheel diode connected to the excitation winding in parallel thereto, switch means connected to the excitation winding, and signal output means connected to a junction point between the excitation winding and the switch means and operative to output a signal associated with an electric generation status of the vehicle electric generator, and an external device including signal input means operative to receive a signal outputted from the signal output means, wherein the method comprises the steps of causing the signal output means to output a modulation signal that is modulated using a duty ratio and a switching frequency of the switch means, causing the external device to detect a first electric generation status based on a duty ratio component of the modulation signal, and causing the external device to detect a second electric generation status based on a frequency component of the modulation signal.

This allows the vehicular electric generation control apparatus to control the duty ration of the switch means, by which excitation current is controlled, and transmit the signal (modulation signal) resulting from modulating the switching frequency while enabling the external device to perform parallel signal processing through which the modulation signal is divided into respective components. Thus, it becomes possible to concurrently detect the plurality of independent electric generation statuses through the use of the signal line in a single path connected between which the vehicular electric generation control apparatus and the external device.

Also, the step of detecting the second electric generation status may preferably include the steps of detecting the frequency component of the modulation signal, comparing the frequency component of the detected modulation signal to a given frequency, and detecting the second electric generation status based on a comparison result. This makes it able for the input frequency to be discriminated depending on the threshold value of the given frequency to provide an ease of demodulating the modulation signals allocated to the different frequencies, enabling the detection of the second electric generation status.

Besides, the step of detecting the frequency component of the modulation signal may be preferably executed by counting the number of pulses of the modulation signal within a given time interval. This allows the input frequency to be measured using the number of pulses counted for the given time interval. Thus, the magnitude of the frequency can be discriminated on a simple program using the counter, enabling the detection of the second electric generation status.

Additionally, the method of detecting the electric generation status may further comprise the step of causing the external device to output a signal for turning on a charge alarm lamp when a frequency of the modulation signal is less than a given frequency and output a signal for turning off the charge alarm lamp when the frequency of the modulation signal exceeds the given frequency. This enables control to be performed for turning on or turning off the charge alarm lamp depending on whether or not the frequency of the modulation signal is higher or less than the given frequency. This enables the external device to control the charge alarm lamp with a large current capacity using a small signal delivered from the vehicular electric generation control apparatus.

Besides, the method of detecting the electric generation status may further comprise the step of causing the external device to output a signal, associated with an electric generation-rate of the vehicle electric generator, to an engine controller. Further, this enables the engine speed to be controlled depending on a value of the duty ratio of the modulation signal that is associated with the electric generation-rate of the vehicular electric generation control apparatus, enabling the idling speed of the engine to be stabilized.

Further, the method of detecting the electric generation status may further comprise the step of causing the external device to output signals, associated with an electric generation-rate of the vehicle electric generator corresponding to the first electric generation status and the rotational speed of vehicle electric generator corresponding to the second electric generation status, to at least one of an electrical load controller, by which electrical load is controlled depending on a supply current of the vehicle electric generator, and an engine controller that controls an engine speed depending on an electric generation torque of the vehicle electric generator.

This further makes it able to concurrently obtain characteristics wherein the duty ratio component of the modulation signal is associated with the electric generation-rate of the vehicle electric generator and the frequency component is associated with the rotational speed of the vehicle electric generator. Thus, the supply current and electric generation torque of the vehicle electric generator can be detected in high precision and the electrical load controller can appropriately control electric power consumption, caused by charging the battery and electrical loads, while grasping the electric power supply capacity of the vehicle electric generator. Also, the engine controller makes it able for the engine speed to be stabilized in high precision for the electric generation torque.

Moreover, the method of detecting the electric generation status may further comprise the step of causing the signal input means to apply a bias voltage to the junction point between the switch means and the excitation winding while biasing a signal input terminal to a given voltage in the absence of the modulation signal. This enables the switch means to input the modulation signal in an increased matching. Also, if disconnection occurs in the signal line, the signal input terminal is biased at the given voltage, providing an ease of judgment, as to whether the modulation signal is absent, and turning on the charge alarm lamp while controlling the external device, such as operation to carry out engine control under a defaulted condition, in response to disconnection of the signal line.

BRIEF DESCRIPTION OF THE DRAWINGS

In the accompanying drawings:

FIG. 7 is a view showing a structure of an external device of the electric generation system of the second embodiment according to the present invention.

DETAILED DESCRIPTION OF THE PREFERRED EMBODIMENTS

Now, vehicular electric generation control apparatuses of various embodiments according to the present invention and related methods of detecting an electric generation status are described below in detail with reference to the accompanying drawings.

First Embodiment

Figure 1:
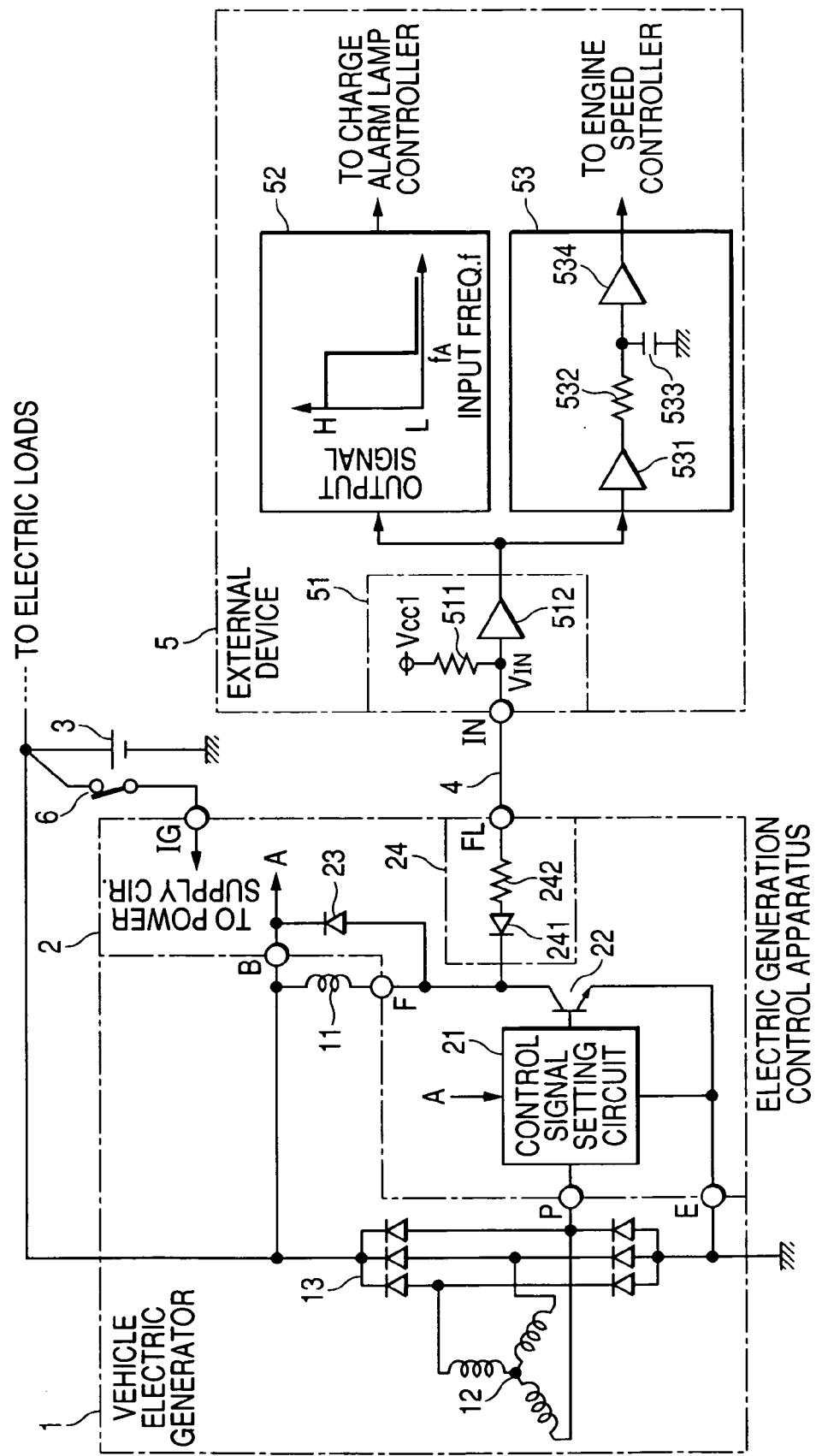
FIG. 1 is a view showing an overall structure of an electric generation system of a first embodiment according to the present invention that includes a vehicle electric generator and an external device.

FIG. 1 is a view illustrating an overall structure of an electric generation system incorporating a vehicle electric generator and an associated external device of a first embodiment according to the present invention. As shown in FIG. 1, the vehicle electric generator 1 of the first embodiment is comprised of an excitation winding 11, an armature winding 12, a rectifier 13 and an electric generation control apparatus 2.

The excitation winding 11 is wound on field poles (not shown) to form a rotor by which a magnetic field is generated when energized. The armature winding 12 is composed of multi-phase windings (such as, for instance, three-phase windings) that are wound on armature cores to form an armature. The armature winding 12 generates an electromotive force due to fluctuation in magnetic field generated by the excitation winding 11. The armature winding 12 generates an alternating current output that is supplied to the rectifier 13.

The rectifier 13 performs full-wave rectification of the alternating current output delivered from the armature winding 12. A DC output derived from the rectifier 13 is extracted to the outside as an output of the vehicle electric generator 1 for supply to a battery 3 and electrical loads (not shown). The output of the vehicle electric generator 1 varies depending on a rotational speed of the rotor and the magnitude of excitation current, flowing through the excitation winding 11, which is controlled by the electric generation control apparatus 2.

The electric generation control apparatus 2 is comprised of a control signal setting circuit 21, a switching element 22, a flywheel diode 23 and a signal output section 24.

The control signal setting circuit 21 has a terminal B, to which the output voltage of the vehicle electric generator 1 is applied, and a terminal P supplied with a phase voltage of the armature winding 12, generating a control signal for controlling turn-on or turn-off operations of the switch element 22.

The switch element 22 is composed of a power transistor having a base connected to an output terminal of the control signal setting circuit 21, a collector connected to the output terminal of the vehicular power generator 1 via the flywheel diode 23 and an emitter connected to ground. Further, the collector of the switch element 22 is connected to the excitation winding 11. When the switch element 22 is turned on, an electric current flows through the excitation winding 11, while, when turned off, the excitation winding 11 is de-energized.

The flywheel diode 23 is connected to the excitation winding 11 in parallel thereto to allow the electric current, flowing through the excitation winding 11, to be circulated when the switch element 22 is turned off.

The signal output section 24 has one terminal, connected to a junction point between the excitation winding 11 and the switch element 22, and the other terminal connected to a signal output terminal (terminal FL). The signal output section 24 includes a diode 241 and a resistor 242 that are connected in series. The diode 241 has a cathode connected to the junction point between the excitation winding 11 and the switch element 22. Further, the resistor 242 has one terminal connected to the Terminal FL. The Terminal FL is connected through a signal line 4 to an external device 5.

The external device 5 is comprised of a signal input section 51, a frequency discriminator circuit 52 and a duty ratio detection circuit 53.

The signal input section 51, operative to perform pulse wave condition of a signal being received, includes a resistor 511 and a buffer circuit 512. The resistor 511 has one terminal, to which a bias voltage $V_{cc1}$ is applied in order to receive the signal from the signal output section 24 of the vehicle electric generator 1 in increased matching, and the other end connected to a signal input terminal (terminal IN) to which an input terminal of the buffer circuit 512 is connected. The buffer circuit 512 has an output terminal connected to a frequency discriminator circuit 52 and a duty ratio detection circuit 53.

The frequency discriminator circuit 52 executes signal processing to acquire a frequency f of an input signal, resulting upon pulse wave condition executed by the signal input section 51, upon which the frequency f is compared to a given frequency $f_4$. Then, if $f<f_4$, an output signal with a high level is generated and if $f>f_4$, an output signal with a low level is generated, with both output signals being transmitted to a charge alarm lamp controller (not shown) that controllably turns on or turns off a charge alarm lamp.

The duty ratio detection circuit 53 is operative to execute signal processing to obtain a duty ratio of the input signal resulting upon pulse wave condition executed by the signal input section 51 and includes a buffer circuit 531, 534, a resistor 532 and a capacitor 533.

With such a structure, the duty ratio detection circuit 53 receives an input signal through the buffer circuit 531 whereby the input signal is integrated using the resistor 532 and the capacitor 533 providing a longer time constant than that of a pulse of the input signal, while permitting a terminal voltage of the capacitor 533 to be outputted via the buffer circuit 534. This allows a duty ratio of the input signal to be converted to a voltage signal in conformity to an electric generation-rate of the vehicle electric generator 1. The voltage signal is delivered to an engine speed controller (not shown) to be utilized for performing controls such as operation to stabilize an idling speed.

Next, detailed description is made of the control signal setting circuit 21 of the electric generation control apparatus 2.

Figure 2:
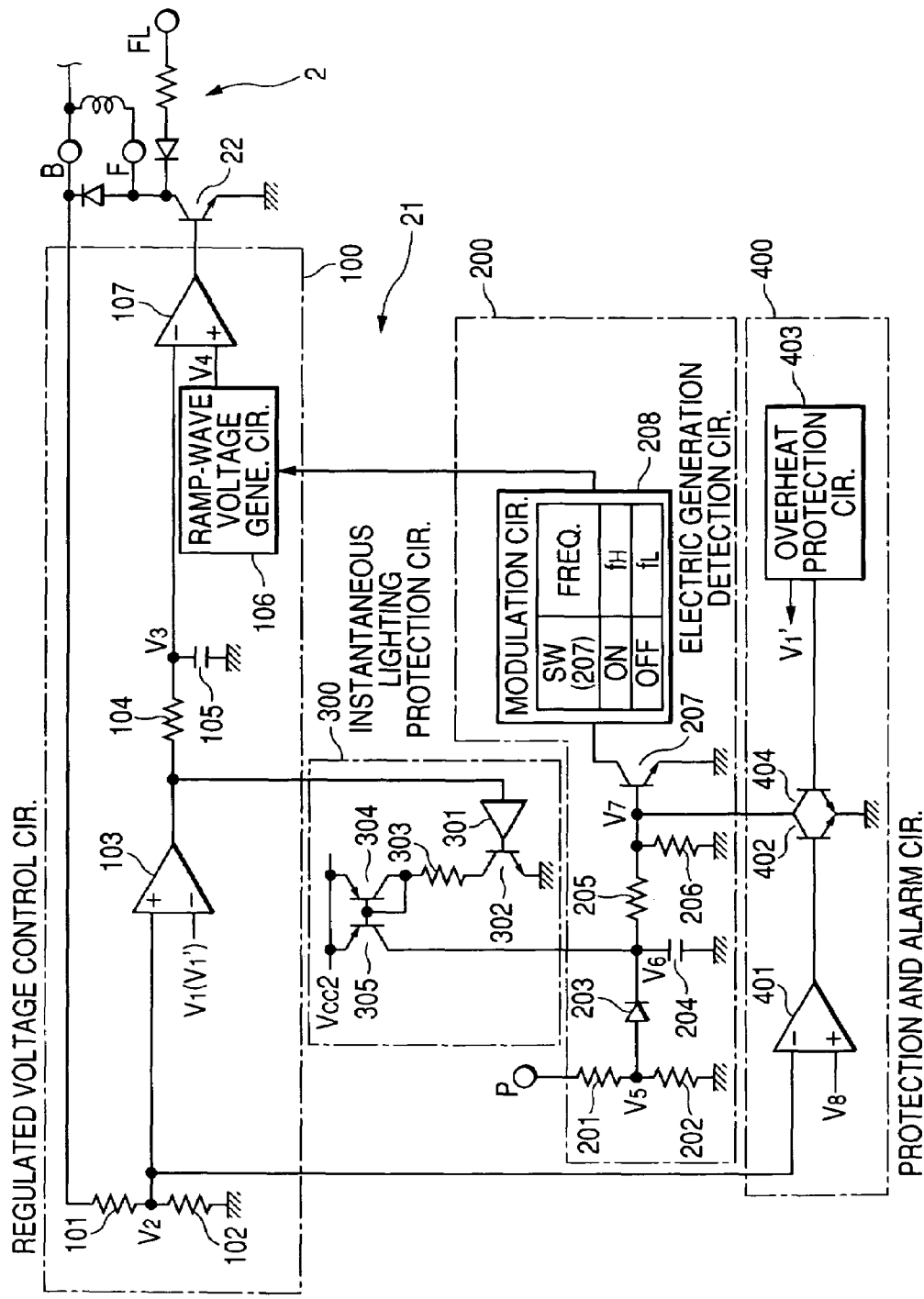
FIG. 2 is a view showing a detailed structure of a control signal setting circuit incorporated in an electric generation control apparatus of the vehicle electric generator shown in FIG. 1.

FIG. 2 is a view showing a detailed structure of the control signal setting circuit 21. As shown in FIG. 2, the control signal setting circuit 21 is comprised of a regulated voltage control circuit 100, an electric generation detection circuit 200, an instantaneous lighting protection circuit 300 and a protection and alarm circuit 400.

The regulated voltage control circuit 100 regulates the output voltage of the vehicle electric generator 1. With an exemplary structure shown in FIG. 2, the regulated voltage control circuit 100 is comprised of resistors 101, 102, 104, voltage comparators 103, 107, a capacitor 105 and a ramp voltage generation circuit 106.

The voltage comparator 103 has a "−" input terminal to which a reference voltage V1, correlated with a regulated voltage (for instance of 14.5V), is applied. In order to detect the output voltage of the vehicle electric generator 1, the output voltage is divided by the resistors 101, 102 to provide an input voltage V2, which is applied to a "+" input terminal of the voltage comparator 103. Further, an output terminal of the voltage comparator 103 is connected to an integrator circuit composed of the resistor 104 and the capacitor 105. The capacitor 105 has one terminal at which a voltage V3 is generated.

The voltage comparator 107 has a "+" input terminal, to which an output voltage V4 of the ramp voltage generation circuit 106 is applied, and a "−" input terminal to which the output voltage V3 of the integrator circuit is applied. Moreover, an output terminal of the voltage comparator 107 is connected to a switch element 22.

The electric generation detection circuit 200 serves to detect a phase as to whether or not the rotor is rotatably driven with the engine to begin operation to generate electric power. In the example shown in FIG. 2, the electric generation detection circuit 200 is comprised of resistors 201, 202, 205, 206, a diode 203, a capacitor 204, a transistor 207 and a modulation circuit 208.

In order to detect phase voltage, occurring on the armature winding 12, a voltage V5, resulting from division by the resistors 201, 202, is applied to an anode of the diode 203.

The capacitor 204 is connected to a cathode of the diode 203 to hold a peak voltage V6 of the phase voltage with a rectangular shape. Also, a voltage V7, appearing upon division by the resistors 205, 206, is applied to a base of the transistor 207 for detecting the peak voltage.

In addition, the resistors 205, 206 and a PN junction between a base and emitter of the transistor 207 serve to progressively discharge the peak voltage V6 from the capacitor 204. The transistor 207 has the collector, connected to the modulation circuit 208, and the emitter connected to ground. An output terminal of the modulation circuit 208 is connected to the ramp voltage generation circuit 106.

The instantaneous lighting protection circuit 300 serves to prevent erroneous operation (of outputting a signal to turn on a charge alarm lamp) of the electric generation detection circuit 200 in the occurrence of a drop in a voltage appearing at the terminal P when electrical load is interrupted during rotation of the engine. In the example shown in FIG. 2, the instantaneous lighting protection circuit 300 is comprised of a buffer circuit 301, transistors 302, 304, 305, and a resistor 303.

The buffer circuit 301 is applied with an output of the voltage comparator 103 of the regulated voltage control circuit 100. The buffer circuit 301 provides an output that is inputted to a base of the transistor 302. The transistor 302 has a collector, connected via a resistor 303 to transistors 304, 305, and an emitter connected to ground. The emitter of the transistor 302 is connected to ground.

The transistors 304, 305 form a current mirror circuit, in which a base and emitter of the transistor 304 is short-circuited, and operate to allow a collector of the transistor 305 to supply an electric current associated with an electric current discharged from the transistor 304 to be determined by the resistor 303. The collector of the transistor 305 is connected to the capacitor 204 of the electric generation detection circuit 200. Emitters of the transistors 304, 305 are applied with a bias voltage $V_{cc2}$.

The protection and alarm circuit 400 has a low voltage alarm function, by which a drop in output voltage of the vehicle electric generator 1 is detected for outputting a signal to turn on a charge alarm lamp, and an overheat protecting function by which electric power generation is interrupted when abnormal overheat develops in the vehicle electric generator 1 and the power generation control circuit 2 upon which a signal is outputted for turning on the charge alarm lamp.

In the example shown in FIG. 2, the protection and alarm circuit 400 is comprised of a voltage comparator 401, transistors 402, 404, and an overheat protection circuit 403. The protection and alarm circuit 400 includes a low voltage alarm functioning section, associated with the voltage comparator 401 and the transistor 402, and an overheat alarm functioning section associated with the overheat protection circuit 403 and the transistor 404.

The voltage comparator 401 has a "+" input terminal, to which a reference voltage V8, representing a low voltage alarm level (a voltage, appearing at the terminal B, which corresponds to 10V that is lower than a battery open voltage), and a "−" input terminal to which the input voltage V2 for detecting the output voltage of the vehicle electric generator 1 is applied. The transistor 402 is turned on and off depending on the output of the voltage comparator 401. The transistor 207 of the electric generation detection circuit 200 has a priority to be turned off when the transistor 402 is turned on.

The overheat protection circuit 403 operates in a way to temporarily lower the reference voltage of the voltage comparator 103 of the regulated voltage control circuit 100 to a value of V1' (such as for instance a voltage corresponding to a regulated voltage level of 12V lower than the battery voltage), upon which the operation is interrupted to stop electric power generation. When this takes place, the overheat protection circuit 403 turns on the transistor 404 while turning off the transistor 207 of the electric generation detection circuit 200 in priority.

The switch element 22, the control signal setting circuit 21 and the signal output circuit 24 correspond to a switch means, a control signal setting means and a signal outputting means, respectively. Moreover, the voltage comparator 103, the integrator circuit composed of the resistor 104 and the capacitor 105, the voltage comparator 107 and the regulated voltage control circuit 100 correspond to a first comparator means, a first smoothing means, a second comparator means and a regulated voltage control means, respectively. Moreover, the electric generation detection circuit 200, the protection and alarm circuit 400 and the instantaneous lighting protection circuit 300 correspond to a modulation means; the resistors 201, 202, the diode 203 and the capacitor 204 correspond to a smoothing means; the resistors 205, 206, the transistor 207 and the modulation circuit 208 correspond to a switchover means; the voltage comparator 401 corresponds to a third comparator means; and the overheat protection circuit 403 corresponds to an overheat protection means. Moreover, the signal input section 51 corresponds to a signal input means and the bias voltage $V_{cc1}$ and the resistor 511 correspond to a biasing means.

Figure 3:
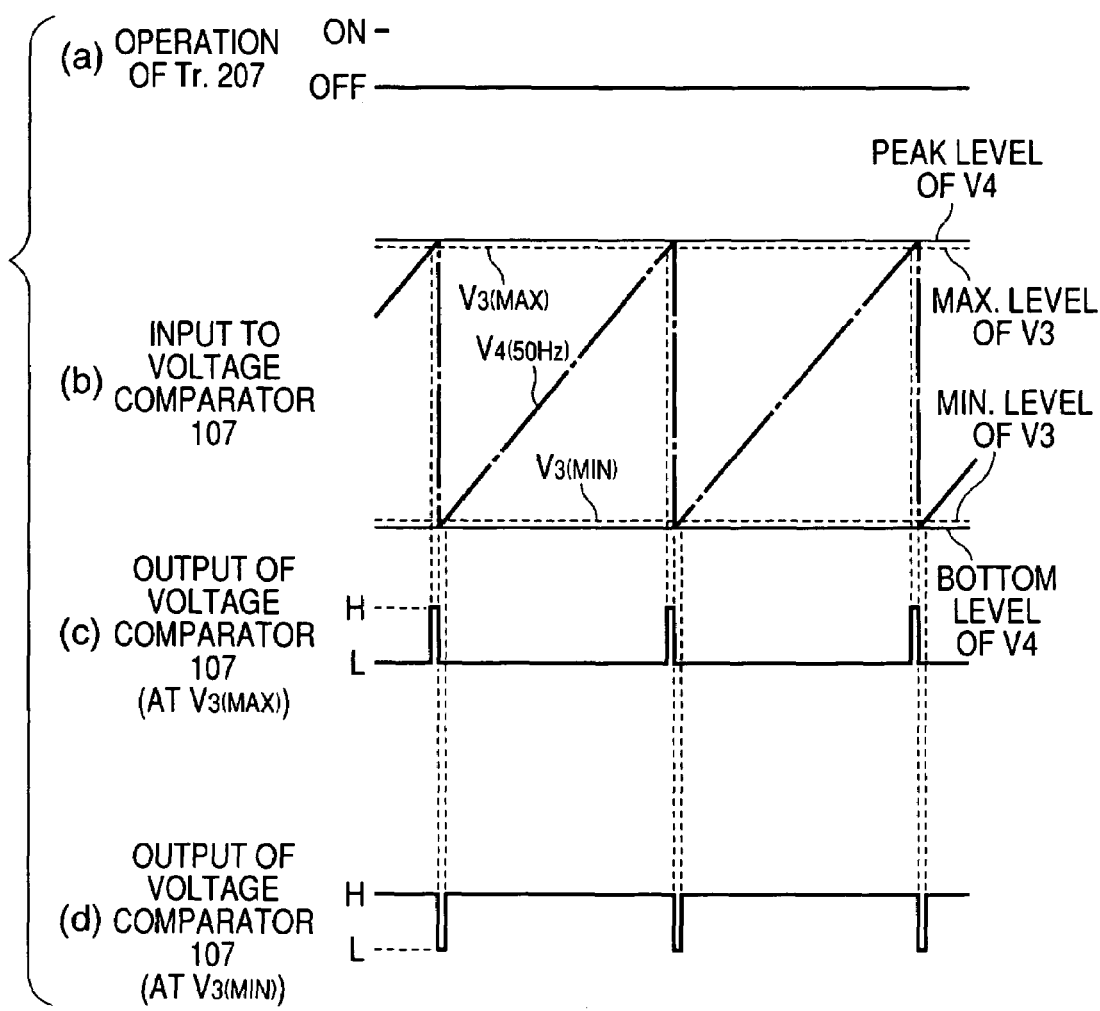
FIG. 3 is a view showing a signal waveform to be inputted to and outputted from various parts of the electric generation control apparatus of the vehicle electric generator shown in FIG. 1.
Figure 4:
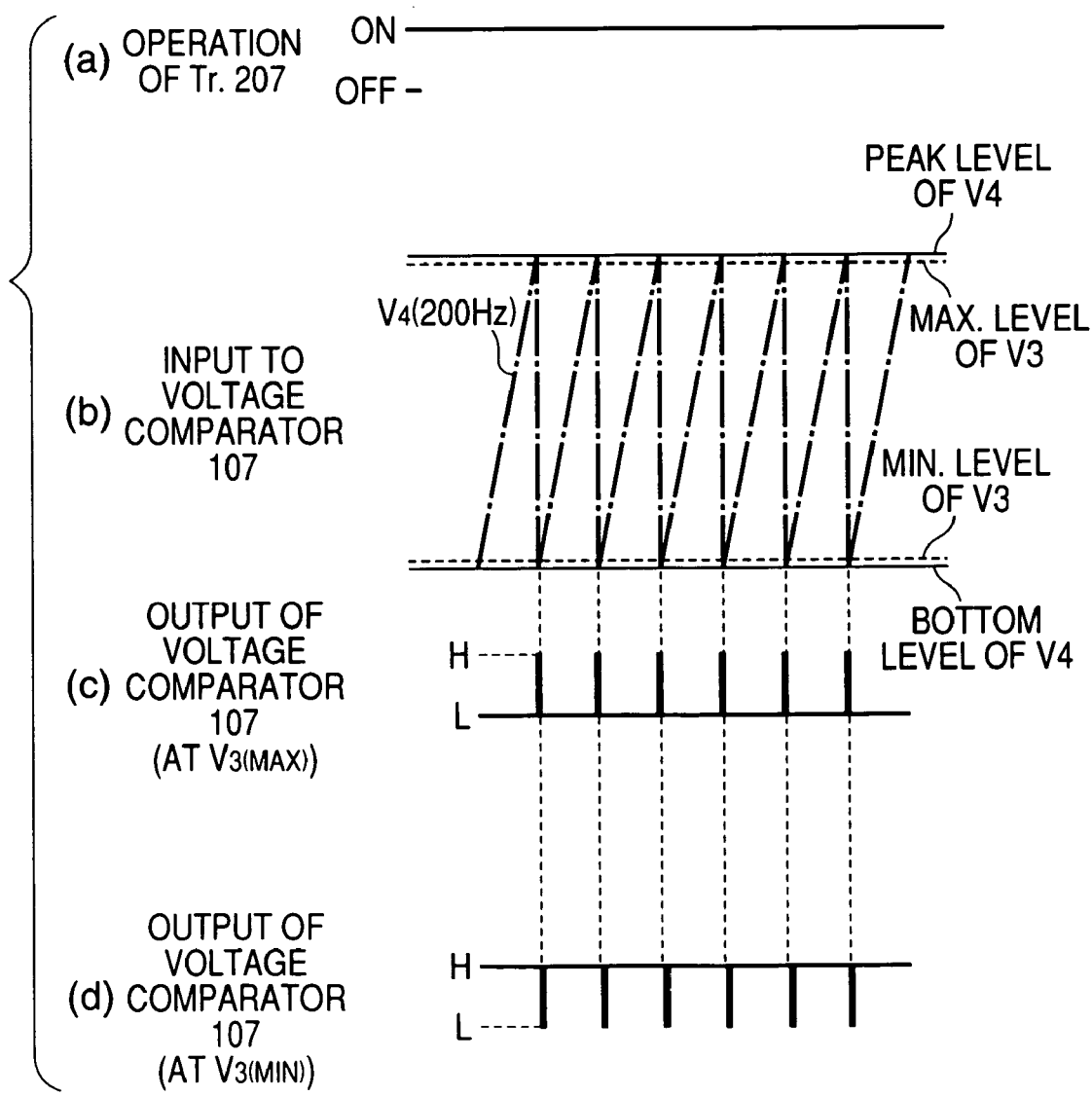
FIG. 4 is a view showing a signal waveform to be inputted to and outputted from various parts of the electric generation control apparatus of the vehicle electric generator shown in FIG. 1.

Now, description is made of operation of the electric generation control apparatus 2 of the present embodiment. FIGS. 3 and 4 are views illustrating signal waveforms that are inputted to or outputted from various parts of the electric generation control apparatus 2.

(Operations Prior to Startup of Engine)

First, in startup of the engine, the electric generation control apparatus 2 is rendered operative to cause a power supply circuit, internally mounted, to enter an operative condition when a key switch 6 is actuated. During non-rotation of the engine, the transistor 207 of the electric generation detection circuit 200 is turned off (see FIG. 3(a)). Therefore, the modulation circuit 208 operates such that the frequency of the ramp-wave voltage is set to a lower frequency $f_L$ (of, for instance, 50 Hz) (FIG. 3(b)).

The voltage comparator 103 of the regulated voltage control circuit 100 provides an output with a low level when the input voltage V2 is less than the reference voltage V1. Accordingly, an electric charge, stored in the capacitor 105, is discharged through the resistor 104. This allows the output voltage V3, appearing at one terminal of the capacitor 105, to lie at a minimum voltage $V3_{(MIN)}$ (FIG. 3(b)).

The voltage comparator 107 outputs a signal with a maximal duty ratio (of, for instance, 99%) in high level depending a comparison result (FIG. 3(b)) between the input voltage V3 and the ramp-wave voltage V4 (at a frequency of 50 Hz) (FIG. 3(d)). The output signal of the voltage comparator 107 is inputted to the switch element 22. This allows the switch element 22 to be driven with the maximal duty (of 99%), causing excitation current to be supplied to the excitation winding 11.

(Operation after Startup of Engine)

Next, as the engine rotates, the armature winding 12 of the vehicle electric generator 1 generates a phase voltage. Then, the phase voltage V5, resulting from division by the resistors 201, 202 of the electric generation detection circuit 200, is peak held by the diode 203 and the capacitor 204, upon which the peak voltage V6 is obtained.

Then, if the voltage V6 (corresponding to the voltage P exceeding, for instance, a value of 6V) higher than a detection threshold value determined by a voltage between the base and emitter of the transistor 207 and the resistors 205, 206, the transistor 207 is turned on (FIG. 4(a)). This causes the modulation circuit 208 to switch over a frequency of the ramp-wave voltage V4 to a higher value of $f_H$ (of, for instance, 200 Hz) (FIG. 4(b)). When this takes place, the voltage V3, appearing at one terminal of the capacitor 105, still remains in a minimum level (of $V3_{(MIN)}$) and the voltage comparator 107 outputs a signal with a maximal duty ratio of high level (FIG. 4(d)).

If the generated voltage further increases and the input voltage V2, for detecting the output voltage of the vehicle electric generator 1, reaches the reference voltage V1 (a voltage corresponding to a regulated voltage of 14.5V), then, the output of the voltage comparator 103 varies to a high level.

Thereafter, the output of the voltage comparator 103 varies from the high level to the low level or from the low level to the high level depending on the generated voltage. Accordingly, such an output is processed by the integrator circuit, composed of the resistor 104 and the capacitor 105, to provide the voltage V3, which in turn varies in a range between the minimum and maximal levels (FIG. 4(b)). The voltage comparator 107 outputs a signal, with a high level ratio varying in a range between the minimum and maximal levels (FIG. 4(c) and FIG. 4(d)), depending on a comparison result between the voltage V3 being inputted and the ramp-wave voltage V4 (of 200 Hz). For instance, the voltage comparator 107 outputs the signal with a high level in a duty ratio ranging from 1% to 99%. This output signal increments or decrements a duty ratio of the switch element 22 being turned on, depending on an output current of the vehicle electric generator 1 to be supplied to the outside, by which the output voltage of the vehicle electric generator 1 is regulated to a given voltage.

In such a way, upon controlling the switch element 22, by which the excitation current is controlled, depending on the duty ratio and switching frequency, the signal output section 24 generates an output signal at the signal output terminal FL as a signal (modulation signal) involving information on a plurality of independent electric generation statuses (such as, for instance, an electric generation-rate status and an electric power detection status (indicative of a result of detecting whether or not the operation begins to generate electric power).

(Operation 1 in Protection and Alarm Function and Example of Low Voltage Alarm Function)

If the input voltage V2 is less than the reference voltage V8 (corresponding to a voltage of, for instance, 10V at the terminal B), the voltage comparator 401 of the protection and alarm circuit 400 outputs a signal with high level. Then, the transistor 402 is turned on and the transistor 207 of the electric generation detection circuit 200 is turned off.

This allows the frequency of the ramp-wave voltage V4 to be switched over from the high frequency $f_H$ (of 200 Hz) to the low frequency fL (of 50 Hz) (FIG. 4(b)→FIG. 3(b)). When this takes place, selecting the frequency $f_L$ allows the charge alarm lamp to be shifted to a turned-on status. Also, the excitation current is controlled in the maximal duty ratio (of 99%) depending on the output signal from the voltage comparator 107 of the regulated voltage control circuit 100 (FIG. 3(d)).

(Operation 2 in Protector and Alarm Function and Example of Overheat Protection and Alarm Function)

If the temperatures of control IC chips, forming the electric generation control apparatus 2, exceed a given temperature T1, the overheat protection circuit 403 of the protection and alarm circuit 400 outputs a signal with a high level to the transistor 404. Then, the transistor 404 is turned on and the transistor 207 of the electric generation control apparatus 200 is turned off.

During such an operation, a frequency of the ramp-wave voltage V4 is switched over from a high frequency $f_H$ (of 200 Hz) to a low frequency $f_L$ (of 50 Hz) (FIG. 4(b)→FIG. 3(b)). When this takes place, selecting the frequency fL allows the charge alarm lamp to be shifted to a turned-on state. Additionally, the "−" input terminal of the voltage comparator 103 of the regulated voltage control circuit 100 is applied with an altered voltage V1' (corresponding to a regulated voltage of, for instance, 12V (lower than a battery voltage)), causing the voltage comparator 103 to output a signal with a high level.

The capacitor 105 is charged via the resistor 104 and the voltage V3, appearing at one end of the capacitor 105, reaches a maximum voltage $V3_{(MAX)}$ (FIG. 3(b)). Depending on a comparison result between the maximum voltage $V3_{(MAX)}$ and the ramp-wave voltage V4 (of 50 Hz), the voltage comparator 107 outputs a signal with a minimum duty cycle (with a ratio of, for instance, 1% in high level) (FIG. 3(c)).

Due to the output signal delivered from the voltage comparator 107, the excitation current is controlled in a minimum duty ratio (of 1%). This results in suppression of an increase in the temperatures of the vehicle electric generator 1 and the power generation control circuit 2. Then, if the temperatures of the associated devices decrease and become less than a given temperature T1 lower than a hysteresis temperature ΔT, electric generation is restarted. When this takes place, the frequency may be selected to lie at $f_H$ to shift the charge alarm lamp to a turned-off state or the frequency $f_L$ may remain intact to continue a turned-on state of the charge alarm lamp until the key switch 6 is turned off.

In such a way, controlling the switch element 22, by which the excitation current is controlled, with the associated duty cycle and switching frequency allows the terminal FL of the signal output section 24 to output a signal (modulation signal) involving a plurality of electric generation statuses (such as, for instance, an electric generation-rate and an alarm light signal).

Figure 5:
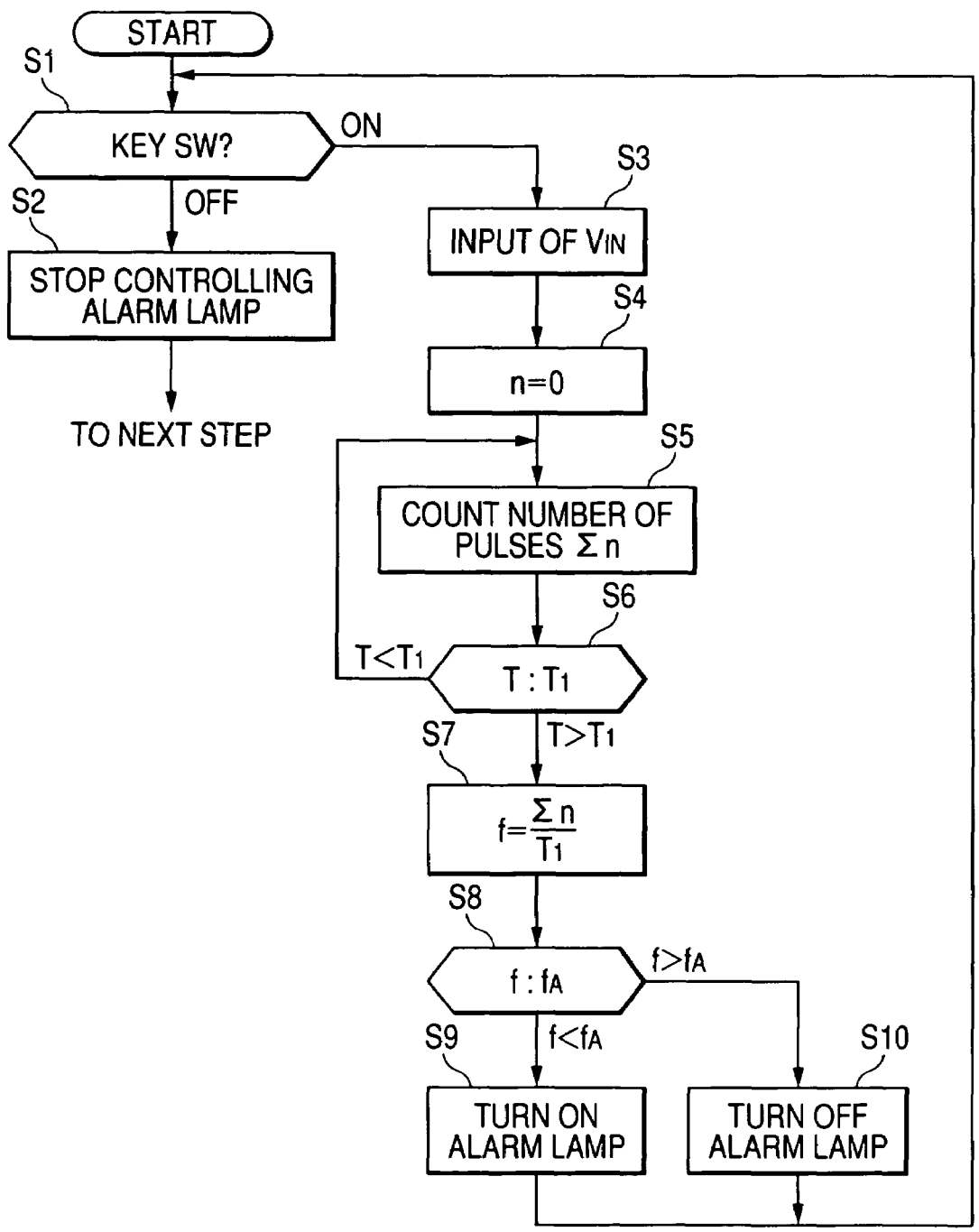
FIG. 5 is a flowchart showing a detailed sequence of operations to be executed by a frequency discriminator circuit incorporated in the external device shown in FIG. 1.

FIG. 5 is a flowchart showing a basic detailed sequence of operations of the frequency discrimination circuit 52 of the external device 5. Hereunder, operations of various steps, shown in FIG. 5, are described.

First, the frequency discrimination circuit 52 makes discrimination as to whether the key switch is turned on or turned off (step S1). As a result, if the key switch is turned off (with "NO"), control of the charge alarm lamp is stopped (step S2). On the contrary, if the key switch is turned on (with "YES"), the signal $V_{IN}$, applied to the terminal IN of the signal input section 51, is taken in via the buffer circuit 512 (step S3).

Next, an n-value, corresponding to the number of pulses to be counted, is set to "0" (step S4), upon which the operation is executed to count the number of pulses of the signal applied in step S3 such that the number of count pulses is accumulated (step S5). The operation is executed to count the number of pulses during a given time T1 (T<T1) by making comparison between time T, elapsed from a timing at which the operation is commenced, and the given time T1 (step S6). Then, if the elapse time exceeds the given time T1 (T>T1), the operation is executed to calculate the frequency f of the signal, inputted in step S3, based on an equation f=Σn/T1 depending on an accumulated value Σn of the number of pulses counted during the time T1 (step S7).

Subsequently, comparison is made between the frequency f, calculated in step S7, and a given frequency $f_A$ (step S8). As a result, if f<$f_A$, a signal with a high level is outputted to the charge alarm lamp controller, by which the charge alarm lamp is controllably turned on (step S9). In contrast, if f>$f_A$, a signal with a low level is outputted to the charge alarm lamp controller, by which the charge alarm lamp is controllably turned off (step S10).

Now, a detailed operation of the frequency discriminator circuit 52 is described.

First, with the frequency discriminator circuit 52, if the vehicle electric generator 1 remains halted due to a halt of the engine when the key switch 6 is turned on, the switch element 22 of the electric generation control apparatus 2 is switched on and off at a low frequency of $f_L$ (of, for instance, 50 Hz) and the signal $V_{IN}$, appearing at the low frequency of $f_L$, is applied to the terminal IN (steps S1 to S3).

Then, the operation is executed to count the number of pulses of the signal VIN at the low frequency of $f_L$ (of 50 Hz) for the given time T1 (steps S4 to S6). For instance, under a condition with T1=100 ms, the accumulated value Σn of the number of count pulses lies at a value of 5.

Subsequently, the frequency f is counted based on T1 and Σn (step S7). Under such conditions set forth above, the presence of T1=100 ms and Σn=5 results in a formula f=5 pulses/100 ms=50 Hz.

Consecutively, discrimination is made to find a difference between the calculated frequency f and the given frequency $f_A$ (step S8). This results in a relationship f<$f_A$ under a condition where, for instance, $f_A$=100 Hz. As a result, a control signal is generated to turn on the charge alarm lamp (step S9). Next, as the engine starts up and electric power generation is commenced, the switch element 22 of the electric generation control apparatus 2 is switched on and off at the high frequency $f_H$ (of, for instance, 200 Hz) and the signal $V_{IN}$, appearing at the high frequency $f_H$, is applied to the terminal IN (steps S1 to S3).

Subsequently, if discrimination is made for the signal $V_{IN}$ at the high frequency $f_H$ (of 200 Hz) under such a condition mentioned above, the number of pulses is detected as Σn=20 pulses for T1 (=100 ms). Therefore, the frequency f of the signal $V_{IN}$ is expressed as f=20 pulses/100 ms=200 Hz (steps S4 to S7).

Consecutively, discrimination is made to find a difference between the frequency f and the given frequency $f_A$ (of 100 Hz) (step S8). As a result, the relationship f>$f_A$ holds under the condition set forth above. This allows a control signal to be outputted for turning off the charge alarm lamp (step S10).

Also, while the exemplary operations have been set forth above in respect of the charge alarm lamp controlled depending on the halt and startup of the engine, the charge alarm lamp may be controlled using the protection and alarm function of the electric generation control apparatus 2. The frequency of the input voltage is switched over from the high frequency $f_H$ to the low frequency $f_L$, causing the control signal to be outputted so as to turn on the charge alarm lamp to provide a driver with an alarm of an abnormal condition.

By the way, under circumstances where a failure takes place to cause short-circuiting between the signal line 4 and ground, the electric generation control apparatus 2 allows the diode 241 to interrupt an uncontrollable excitation current, thereby preventing an abnormal increase in output voltage of the vehicle electric generator 1.

Further, during a halt of the engine, the operation is executed to interrupt an electric current flowing through the excitation winding 11 that would cause wasteful power consumption of the battery 3, enabling the battery 3 from over-discharging. Upon operation of the frequency discriminator circuit 52 to discriminate that the input frequency lies at 0 Hz, the external device 5 outputs a signal with a high level for controllably turning on the charge alarm lamp.

Further, if the signal line 4 is erroneously connected to a battery potential, the electric generation control apparatus 2 limits an electric current flowing from the terminal FL of the signal output section 24 via the resistor 242, enabling the switch element 22 from being damaged due to a short-circuited current. Upon operation of the frequency discriminator circuit 52 to discriminate that the input frequency lies at 0 Hz, the external device 5 outputs the signal with the high level for controllably turning on the charge alarm lamp.

Furthermore, under situations where the signal line 4 results in an open-failure, the electric generation control apparatus 2 performs control to normally generate electric power. With the external device 5, the terminal $V_{IN}$ is applied with a biased voltage $V_{cc1}$ resulting from the resistor 511. Then, the frequency discriminator circuit 52 discriminates that the input frequency lies at 0 Hz, outputting a signal with a high level for controllably turning on the charge alarm lamp.

Thus, the electric generation control apparatus 2 of the present embodiment can output a signal, including a duty ratio component, related to a first electric generation status, and a switching frequency component related to a second electric generation status, by using the duty ratio and the switching frequency of the switch element 22 for controlling the current flowing through the excitation winding 11. Therefore, a single output driver (that doubles as the switch element 22) can output a plurality of electric generation statuses, enabling a simplification of the signal line accompanied by reduction in costs while preventing the occurrence of a loss or lapse of information.

Moreover, the duty ratio component is generated depending on the output voltage of the vehicle electric generator 1 under a status with the excitation winding 11 being conducted, enabling electric generation-rate information to be generated as the first electric generation status. In addition, the switching frequency can be altered with no adverse affect on the duty ratio of the switch element 22. That is, electric generation-rate information, outputted from the signal output terminal (terminal FL) is generated with no adverse affect without adversely affecting the output of the vehicle electric generator 1.

Besides, the frequency of the ramp-wave voltage is switched over when the voltage, resulting from smoothing the voltage generated by the armature winding 12, exceeds a given value, enabling the operation to be executed to simultaneously output electric generation-rate information of the vehicle electric generator 1 and, in addition thereto, alarm information as a second electric generation status, when the vehicle electric generator 1 begins to generate electric power, under a situation where the switching frequency is switch over depending on whether or not the electric generation is commenced.

Additionally, the protection and alarm circuit 400 includes the voltage comparator 401 for making comparison between the output voltage of the electric generator 1 and a given value lower than a predetermined battery open voltage. Depending on a result of comparison made by the voltage comparator 401, the frequency of the ramp-wave voltage is altered, enabling the operation to be executed to simultaneously output electric generation-rate information of the vehicle electric generator 1 and, in addition thereto, alarm information as a second electric generation status, when a voltage drop occurs in the vehicle electric generator 1, under a situation where the switching frequency is switch over in response to a drop in output voltage of the vehicle electric generator 1.

Further, the protection and alarm circuit 400 is comprised of the overheat protection circuit 403 operative such that when the temperature exceeds a given level, the reference voltage V1, to be used in the voltage comparator 103, is altered to a reference voltage V1' lower than the battery open voltage while altering the frequency of the ramp-wave voltage.

This makes it able for the reference voltage to be set to a lower level than the battery open voltage when the temperature of the electric generator 1 exceeds the given level, minimizing the duty ratio of the switch element 22 to limit an electric current in power generation for suppressing the development of heat whereby the electric generation control apparatus 2 can be prevented from overheating. Also, the operation can be executed to concurrently output electric generation-rate information as the first electric generation status and, additionally, output alarm information as the second electric generation status upon shifting the switching frequency in response to abnormal overheating of the electric generator 1.

Furthermore, the signal output section 24 includes the diode 241 and the resistor 242 by which current flowing through the signal line 4 is limited. Thus, the signal output section 24 limits the current, flowing through a path from the junction point between the excitation winding 11 and the switch element 22 to the signal line 4 or the current flowing from the signal line 4 to the junction point. This prevents the occurrences of an abnormal increase in a generated output voltage during rotation of the engine, over-discharging of the battery 3 during a halt of the engine and damages of the switch element 22 and the current limiting element (diode) due to short-circuited current caused by the battery 3 under circumstances where a failure occurs in short-circuiting with ground of the signal line 4 or when erroneous connection is made to a battery potential.

Moreover, the electric generation control apparatus 2 is configured to control the duty ratio of the switch element 22, by which the excitation current is controlled, while transmitting a signal (modulation signal) resulting from modulating the switching frequency to the external device 5 that performs signal processing of the modulation signal for respective components in parallel to each other. This enables the operation to be executed to concurrently detect a plurality of electric generation statuses independently from the signal line 4 of one signal path between which the electric generation control apparatus 2 and the external device 5 are connected.

Also, the external device 5 is configured to discriminate the input frequency based on a threshold value of a given frequency, providing an ease of demodulating the modulated signal allocated to different frequencies while enabling the detection of the second electric generation status.

Additionally, the external device 5 detects the frequency component of the modulation signal by counting the number of pulses of the modulation signal for a given time interval. This allows the input frequency to be counted using the number of pulses of the modulation signal for the given time interval. Therefore, the magnitude of the frequency can be discriminated using a counter operating under a simple program, enabling the detection of the second electric generation status.

Further, in an event that the frequency of the modulation signal is less than the given frequency, the external device 5 outputs a signal for turning on the charge alarm lamp. In contrast, if the frequency of the modulation signal is higher than the given frequency, the external device 5 outputs a signal for turning off the charge alarm lamp. Thus, the charge alarm lamp can be controllably turned on or turned off depending on whether the frequency of the modulation signal is higher or lower than the given frequency. Therefore, a signal with a small current delivered from the electric generation control apparatus 2 enables the external device 5 to control the charge alarm lamp with a large current capacity.

Furthermore, the external device 5 outputs a signal, related to the electric generation-rate of the vehicle electric generator 1, to an engine controller. Thus, the duty ratio of the modulation signal corresponds to the electric generation-rate of the vehicle electric generator 1. Therefore, the engine speed can be controlled depending on the magnitude of the duty ratio of the modulation signal, enabling the stabilization of an idling speed of the engine.

Moreover, the signal input section 51 of the external device 5 includes the resistor 511 that plays a role as a biasing means from which a bias voltage is applied to the junction point between the switch element 22 and the excitation winding 11 and by which the signal input terminal IN is biased to a bias voltage in the absence of the modulation signal.

With such a configuration, the switch element 22 can input the modulation signal to the external device 5 in an increased matching. Also, under circumstances where disconnection occurs in the signal line 4, the signal input terminal IN is biased to a given voltage. Thus, the absence of the modulation signal can be easily discriminated and the charge alarm lamp is turned on while the external device 5 can perform a control, such as engine control under a defaulted condition, in correspondence to the disconnection of the signal line 4.

Second Embodiment

The second embodiment differs in structure from the first embodiment in that the electric generation detection circuit 200 of the electric generation control apparatus 2 is replaced by an electric generation detection circuit 200A and the external device 5 is replaced by an external device 5A. Hereunder, description is made of the second embodiment with a focus on these differing points.

Figure 6:
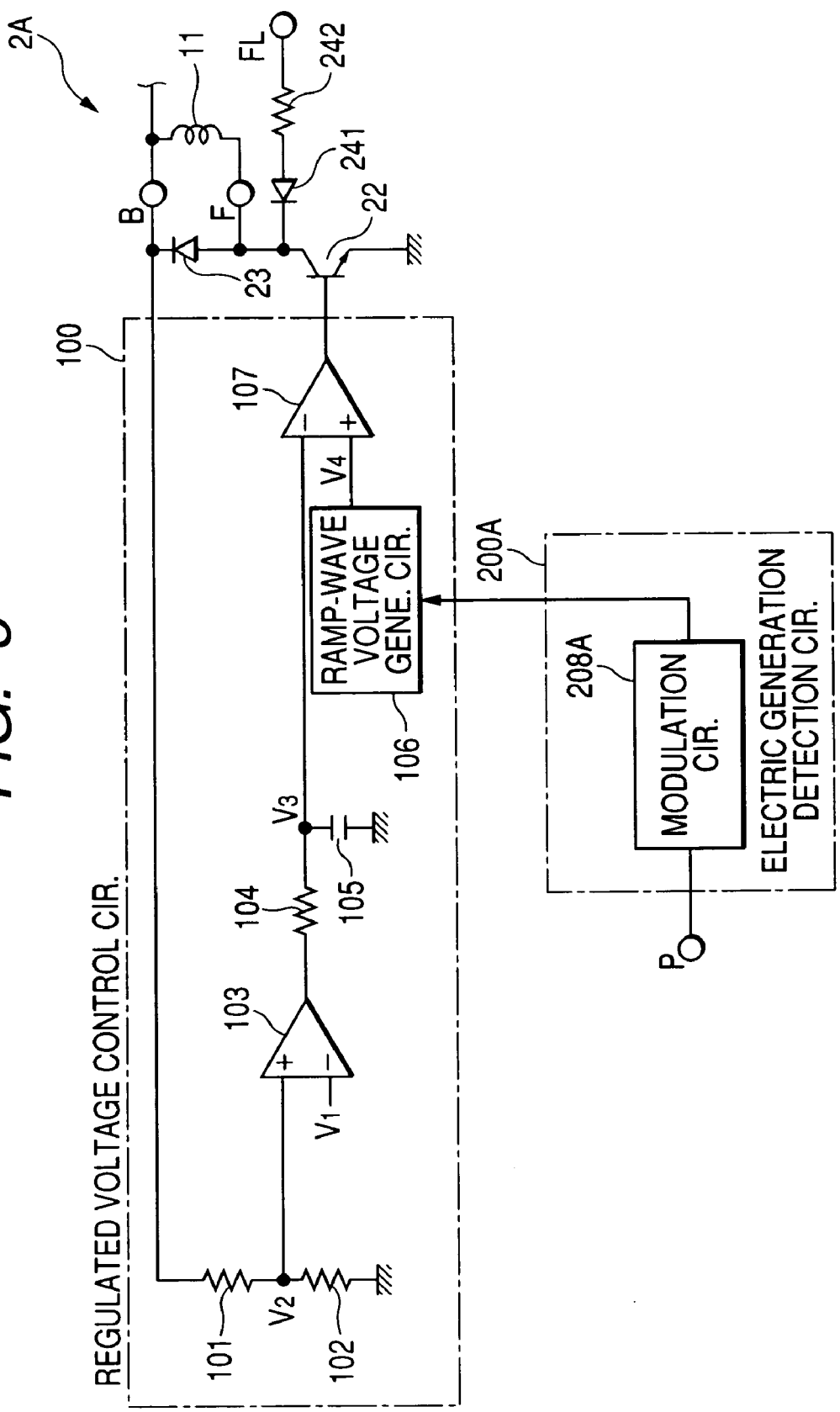
FIG. 6 is a view showing a structure of an electric power detection circuit of the electric generation system of a second embodiment according to the present invention.

FIG. 6 is a view showing a structure of the electric generation detection circuit 200A of the present invention. The electric generation detection circuit 200A, shown in FIG. 6, includes a modulation circuit 208A. The modulation circuit 208A is directly connected to a terminal P, to which a voltage P (rectangular-wave signal) corresponding to a rotational speed of the vehicle electric generator 1 is inputted, and performs modulation processing that consecutively varies a frequency of a ramp-wave voltage depending on the rectangular-wave signal P. The second embodiment differs widely in such a point from the modulation circuit 208 of the first embodiment wherein modulation processing is executed to switch over the frequency of the ramp-wave voltage in two high and low stages.

FIG. 7 is a view showing a structure of the external device 5A of the present invention. The external device 5A, shown in FIG. 7, differs from the external device 5 shown in FIG. 1 in that the frequency discriminator circuit 52 is replaced by a frequency discriminator circuit 52A and an electric generator characteristic calculation circuit 54 is additionally provided.

The frequency discriminator circuit 52A calculates the rotational speed of the vehicle electric generator 1 depending on a frequency of a signal being inputted from the signal input section 51.

The electric generator characteristic calculation circuit 54 includes an electric output current calculator 541, which calculates an electric output current depending on various output values of the frequency discriminator circuit 52A and the duty ratio detection circuit 53, to transmit calculation results to an electrical load controller (not shown), and an electric generation torque calculator 542 that executes operations to calculate electric generation torque for transmitting calculation results to an engine controller (not shown).

With the electric generation control apparatus 2A, a rectangular-wave signal P with a frequency of 200 Hz appears at the terminal P of the vehicle electric generator 1 supposing that the vehicle electric generator 1 is rotatably driven at a speed of 2000 rpm (at a rotational speed corresponding to idling rotation of an engine).

With the modulation voltage control circuit 100, a frequency of the ramp-wave voltage, generated by the ramp-wave voltage generator 106, is modulated at a frequency of 200 Hz. Then, the modulation voltage control circuit 100 controls the duty ratio of the switch element 22 depending on an output current of the vehicle electric generator 1 to be supplied to the outside.

Here, as the engine speed decreases with the resultant drop in the rotational speed of the vehicle electric generator 1, a drop occurs in the rectangular-wave signal P appearing at the terminal P. Then, the duty ratio of the switch element 22 of the vehicle electric generator 1 increases, tending to maintain a modulation voltage at a fixed level. When this takes place, a torque of the vehicle electric generator 1 increases, with the resultant increase in engine loads.

With respect to such an operating characteristic of the vehicle electric generator 1, the electric generation control apparatus 2A concurrently outputs rotational speed information and electric generation-rate information of the vehicle electric generator 1 as modulation signals, making it possible to transmit an electric power-generating characteristic in terms of the rotational speed on a real time basis.

Upon receipt of the modulation signal delivered from the electric generation control apparatus 2A, the external device 5A causes the frequency detection circuit 52A and the duty ratio detection circuit 53 to execute parallel processing of the rotational speed and the electric generation-rate of the vehicle electric generator 1 for demodulation of respective information.

Then, the electric output current calculator 541 and the electric generation torque calculator 542 calculate characteristic values of the electric output current and electric generation torque, respectively, based on the electric generation-rate, output current characteristic and electric generation torque characteristic in terms of the rotational speed of the vehicle electric generator 1.

Thus, the engine controller can stabilize the engine speed with high precision depending on the calculated electric generating torque. Further, the electrical load controller can appropriately control electric power consumption caused by charging a battery and electrical loads while grasping an electric power generation capacity of the vehicle electric generator 1. For instance, the operation is executed to perform control such as operation to temporarily limit the use of the electrical loads for charging a battery in priority.

Thus, the electric generation control apparatus 2A of the present embodiment generates electric generation-rate information of the vehicle electric generator 1 and, in addition thereto, a switching frequency component associated with the rotational speed of the vehicle electric generator 1. Therefore, rotational speed information of the vehicle electric generator 1 can be outputted as a second electric generation status.

Further, the external device 5A is operative to concurrently obtain characteristics under which a duty ratio component of the modulation signal is associated with the electric generation-rate of the vehicle electric generator 1 and a frequency component of the modulation signal is associated with the rotational speed of the vehicle electric generator 1. Therefore, a supply current and electric generation torque of the vehicle electric generator 1 can be detected in high precision. Moreover, the electrical load controller can appropriately control electric power consumption resulting from the charging of the battery and electrical loads while grasping an electric power generation capacity of the vehicle electric generator 1. Also, the engine controller is operative to stabilize the engine speed in terms of the electric generation torque.

(Modifications)

Besides, the present invention is not limited to the embodiments set forth above and various modifications may be implemented without departing from the scope of the present invention.

For instance, the external device 5A, shown in FIG. 7, may be combined with the frequency discriminator circuit 52 so as to enable control of lighting statuses of a charge alarm lamp.

Further, when open failure or short-circuiting failure occurs in the switch element 22, no pulse of the modulation signal is outputted. Therefore, the external device 5 discriminates the presence of a low frequency to controllably turn on the charge alarm lamp, providing a driver with abnormal notification.

Furthermore, when disconnection occurs in the excitation winding 11, no voltage P appears at the terminal P and the switch element 22 is switched on and off at a low frequency. Therefore, the external device 5 is operative to discriminate the low frequency and controllably turn on the charge alarm lamp, providing the driver with abnormal notification.

Moreover, the diode 241 does not deliver the voltage, appearing at the terminal B, to the terminal FL. Therefore, no surge voltage, appearing at the terminal B, is transferred to the signal line 4 and the external devices 5, 5A, suppressing the occurrence of defects resulting from noises.

Also, while the first embodiment has been described with reference to an example wherein the frequencies are allocated to two kinds of the low frequency $f_L$ and high frequency $f_H$, an alternative may be implemented in a way to allocate more than three kinds of frequencies to allow the external device 5 to distinguish the more than three kinds of frequencies from each other.

For the sake of completeness, it should be mentioned that the various embodiments explained so far are not definitive lists of possible embodiments. The expert will appreciates that it is possible to combine the various construction details or to supplement or modify them by measures known from the prior art without departing from the basic inventive principle.

What is claimed is:

1. A vehicular generation control apparatus operative to control an electric generation status of a vehicle electric generator having an armature winding, an excitation winding and a rectifier connected to the armature winding, comprising:
   a flywheel diode connected to the excitation winding in parallel thereto;
   switch means connected to the excitation winding to be turned on and off in response to a control signal being inputted;
   control signal setting means operative to control a duty ratio of the switch means depending on a first electric generation status of the vehicle electric generator for controlling an electric current flowing through the excitation winding while setting the control signal, to be applied to the switch element, so as to vary a switching frequency of the switch means depending on a second electric generation status; and
   signal outputting means connected to a junction point between the excitation winding and the switch means and operative to output a signal, involving a component of the duty ratio associated with the first electric generation status and a component of the switching frequency associated with the second electric generation status, to an external device through a signal line.

2. The vehicular generation control apparatus according to claim 1, wherein:
   the control signal setting means comprises:
   first comparator means for making comparison between an output voltage of the vehicle electric generator and a first predetermined reference voltage;
   first smoothing means for smoothing an output of the first comparator means with a first time constant;
   second comparator means for making comparison between a smoothed voltage outputted from the first smoothing means and a ramp-wave voltage, by which the switching frequency is determined; and
   regulated voltage control means for determining the duty ratio depending on a comparison result of the second comparator means.

3. The vehicular generation control apparatus according to claim 2, wherein:
   the control signal setting means further comprises modulation means that varies a frequency of the ramp-wave voltage.

4. The vehicular generation control apparatus according to claim 3, wherein:
   the modulation means determines the frequency of the ramp-wave voltage depending on a signal, occurring on the armature winding, which is associated with a rotational speed of the vehicle electric generator.

5. The vehicular generation control apparatus according to claim 3, wherein:
   the modulation means comprises:
   second smoothing means for smoothing a voltage, generated by the armature winding, with a second time constant; and
   switchover means operative to switch over the frequency of the ramp-wave voltage when a smoothed voltage, outputted from the second smoothing means, exceeds a given value.

6. The vehicular generation control apparatus according to claim 3, wherein:
   the modulation means comprises third comparator means operative to make comparison between an output voltage of the vehicle electric generator and a predetermined voltage previously set to be lower than a battery open voltage for altering the frequency of the ramp-wave voltage depending on a comparison result of the third comparator means.

7. The vehicular generation control apparatus according to claim 3, wherein:
   the modulation means comprises overheat protector means operative to set the first reference voltage, to be used in the first comparator means, to a second reference voltage lower than a battery open voltage when a temperature exceeds a given value while altering the frequency of the ramp-wave voltage.

8. The vehicular generation control apparatus according to claim 1, wherein:
   the signal output means comprises current limiting means that limits an electric current between the junction point and the signal line.

9. A method of detecting an electric generation status of an electric generation system comprising:
   a vehicle electric generator driven by an engine and having an armature winding, an excitation winding and a rectifier connected to the armature winding;
   a vehicular electric generation control apparatus including a flywheel diode connected to the excitation winding in parallel thereto, switch means connected to the excitation winding, and signal output means connected to a junction point between the excitation winding and the switch means and operative to output a signal associated with an electric generation status of the vehicle electric generator; and
   an external device including signal input means operative to receive a signal outputted from the signal output means;
   the method comprising the steps of:
   causing the signal output means to output a modulation signal modulated using a duty ratio and a switching frequency of the switch means;
   causing the external device to detect a first electric generation status based on a duty ratio component of the modulation signal; and causing the external device to detect a second electric generation status based on a frequency component of the modulation signal.

10. The method of detecting the electric generation status according to claim 9, wherein:

the step of detecting the second electric generation status includes steps of detecting the frequency component of the modulation signal, comparing the frequency component of the detected modulation signal to a given frequency, and detecting the second electric generation status based on a comparison result.

11. The method of detecting the electric generation status according to claim 10, wherein:

the step of detecting the frequency component of the modulation signal is executed by counting the number of pulses of the modulation signal within a given time interval.

12. The method of detecting the electric generation status according to claim 10, further comprising the step of:

causing the external device to output a signal for turning on a charge alarm lamp when a frequency of the modulation signal is less than a given frequency and output a signal for turning off the charge alarm lamp when the frequency of the modulation signal exceeds the given frequency.

13. The method of detecting the electric generation status according to claim 9, further comprising the step of:

causing the external device to output a signal, associated with an electric generation-rate of the vehicle electric generator, to an engine controller.

14. The method of detecting the electric generation status according to claim 9, further comprising the step of:

causing the external device to output signals, associated with an electric generation-rate of the vehicle electric generator corresponding to the first electric generation status and the rotational speed of vehicle electric generator corresponding to the second electric generation status, to at least one of an electrical load controller, by which electrical load is controlled depending on a supply current of the vehicle electric generator, and an engine controller that controls an engine speed depending on an electric generation torque of the vehicle electric generator.

15. The method of detecting the electric generation status according to claim 12, further comprising the step of:

causing the signal input means to apply a bias voltage to the junction point between the switch means and the excitation winding while biasing a signal input terminal to a given voltage in the absence of the modulation signal.

16. An electric generation system comprising:

a vehicle electric generator driven by an engine and having an armature winding, an excitation winding and a rectifier connected to the armature winding;

a vehicular electric generation control apparatus operative to control an electric generation status of the vehicle electric generator; and an external device connected to the vehicular electric generation control apparatus; wherein:

the vehicular electric generation control apparatus comprises:

switch means connected to the excitation winding and operative to be turned on and off in response to a control signal being applied;

control signal setting means operative to control a duty ratio of the switch means depending on a first electric generation status of the vehicle electric generator for controlling an electric current flowing through the excitation winding while setting the control signal so as to vary a switching frequency of the switch means depending on a second electric generation status; and signal outputting means connected to a junction point between the excitation winding and the switch means and operative to output a signal, involving a component of the duty ratio associated with the first electric generation status and a component of the switching frequency associated with the second electric generation status, to the external device through a signal line; and wherein the external device comprises:

first detection means for detecting a first electric generation status based on the duty ratio component of the signal; and second detection means for detecting a second electric generation status based on the frequency component of the signal.

* * * * *